(12) United States Patent
Benecke

(10) Patent No.: US 8,823,313 B2
(45) Date of Patent: Sep. 2, 2014

(54) DEVICE FOR OPERATING SYNCHRONOUS MOTORS AND ASSOCIATED METHOD

(75) Inventor: Marcel Benecke, Magdeburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/580,244

(22) PCT Filed: Nov. 22, 2010

(86) PCT No.: PCT/EP2010/067930
§ 371 (c)(1),
(2), (4) Date: Aug. 21, 2012

(87) PCT Pub. No.: WO2011/101051
PCT Pub. Date: Aug. 25, 2011

(65) Prior Publication Data
US 2012/0313566 A1    Dec. 13, 2012

(30) Foreign Application Priority Data
Feb. 22, 2010   (DE) .......................... 10 2010 008 814

(51) Int. Cl.
*H02P 6/00*      (2006.01)

(52) U.S. Cl.
USPC ............... 318/721; 318/690; 318/47; 318/73; 318/74; 318/700

(58) Field of Classification Search
USPC .......................... 318/721, 690, 47, 73, 74, 700
See application file for complete search history.

(56) References Cited

U.S. PATENT DOCUMENTS

| | | | |
|---|---|---|---|
| 3,775,649 A | 11/1973 | Bayer et al. | |
| 4,125,796 A * | 11/1978 | Nagase et al. | 318/721 |
| 4,488,101 A * | 12/1984 | Studtmann | 318/800 |
| 5,675,226 A | 10/1997 | Riola' | |
| 6,104,177 A | 8/2000 | Fritsch et al. | |
| 6,603,795 B2 * | 8/2003 | Ma et al. | 373/102 |
| 2003/0205989 A1 * | 11/2003 | Garrigan et al. | 322/28 |
| 2007/0145928 A1 | 6/2007 | Crane | |
| 2011/0074325 A1 | 3/2011 | Crane | |

FOREIGN PATENT DOCUMENTS

| | | |
|---|---|---|
| DE | 2132178 A1 | 1/1973 |
| DE | 19533076 A1 | 3/1997 |
| DE | 19641832 C1 | 4/1998 |
| DE | 19641832 C1 | 4/1998 |

(Continued)

OTHER PUBLICATIONS

International Search Report PCT/ISA/210 for International Application No. PCT/EP2010/067930 dated Jun. 18, 2012.

(Continued)

*Primary Examiner* — Bentsu Ro
*Assistant Examiner* — Iftekhar Mustafa
(74) *Attorney, Agent, or Firm* — Harness, Dickey & Pierce, P.L.C.

(57) ABSTRACT

The synchronous motors are controlled by a three-phase AC power controller. According to an embodiment of the invention, firing points for the AC power controller are determined. A pair of two or three phases is determined from the angular position of the rotor, for which the firing points can be present for the respective A.C power controller. Actual firing points are determined from the mains voltage phase position of the phases so that only positive torque is produced.

10 Claims, 2 Drawing Sheets

(56) References Cited

FOREIGN PATENT DOCUMENTS

| | | |
|---|---|---|
| DE | 10045291 A1 | 3/2002 |
| DE | 10045291 A1 | 3/2002 |
| EP | 1240712 B1 | 9/2003 |
| EP | 1798847 A2 | 6/2007 |
| EP | 1798847 A2 | 6/2007 |
| JP | 55111688 A | 8/1980 |
| JP | 55111688 A | 8/1980 |
| JP | 58051784 A | 3/1983 |
| JP | 58051784 A | 3/1983 |
| JP | 60009393 A | 1/1985 |
| JP | 60009393 A | 1/1985 |

OTHER PUBLICATIONS

Priority Document German Application No. 10 2010 008 814.5 filed Feb. 22, 2010.

* cited by examiner

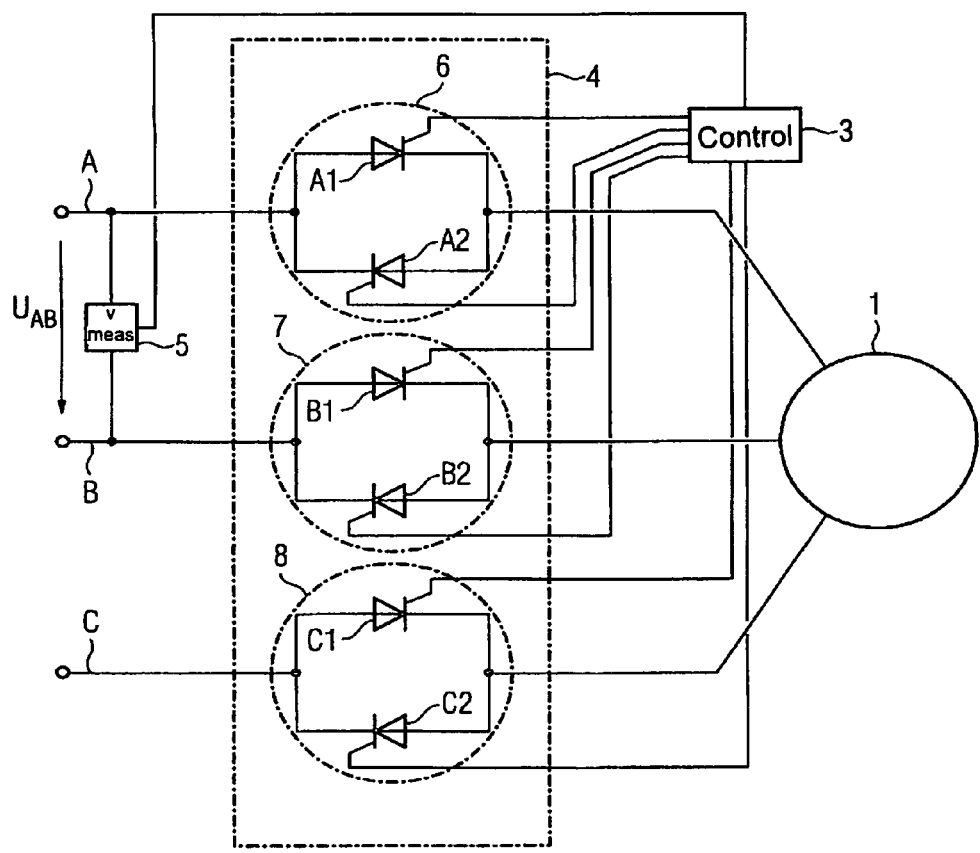

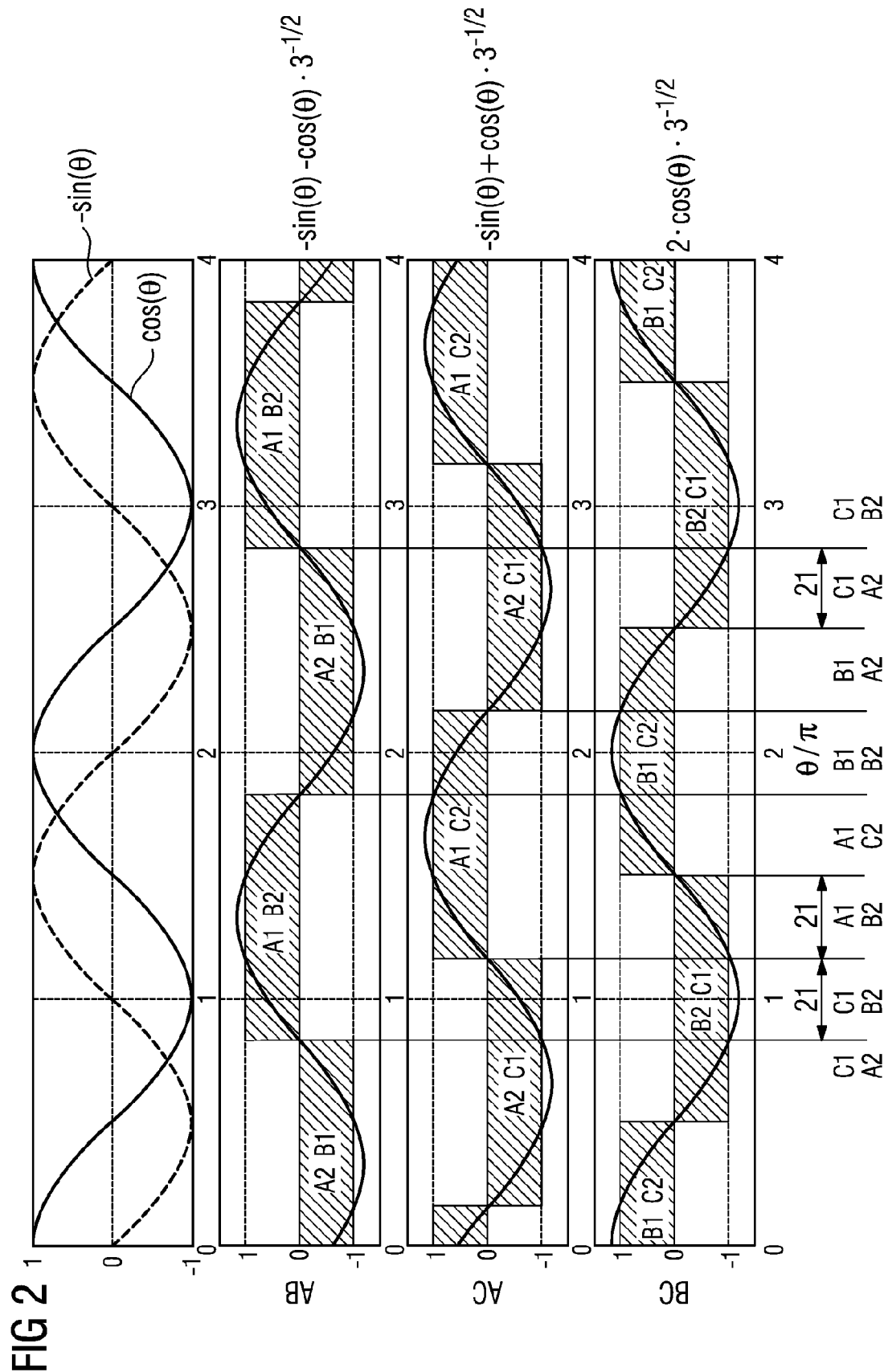

DEVICE FOR OPERATING SYNCHRONOUS MOTORS AND ASSOCIATED METHOD

PRIORITY STATEMENT

This application is the national phase under 35 U.S.C. §371 of PCT International Application No. PCT/EP2010/067930 which has an International filing date of Nov. 22, 2010, which designated the United States of America, and which claims priority to German patent application number DE 10 2010 008 814.5 filed Feb. 22, 2010, the entire contents of each of which are hereby incorporated herein by reference.

FIELD

At least one embodiment of the invention generally relates to a device for operating synchronous motors and an associated method for operating synchronous motors using three-phase AC power controllers which are connected to a three-phase system ("mains") and which comprise at least two semiconductor controllers, e.g. inverse parallel connected thyristors, which are switched, i.e. fired, at particular instants.

BACKGROUND

Three-phase synchronous motors without starting cage are by their very principle tied to the frequency of the supplying three-phase system. Such motors cannot therefore be started, i.e. run up to speed, directly from the system. Rather, a run-up enabling device must be provided between the three-phase system and the synchronous machine. For this purpose a frequency converter is normally used. The frequency converter consists of a rectifier, a DC link (capacitor) and an inverter. It is used to produce three-phase current with adjustable frequency.

SUMMARY

At least one embodiment of the invention specifies a method and/or a device enabling a synchronous machine to be operated from a three-phase system with very little outlay in terms of power electronic components. In particular, starting of the synchronous machine is also to be made possible thereby.

Developments of the invention are set forth in the dependent claims.

With the method according to at least one embodiment of the invention for operating a synchronous motor, a three-phase AC power controller is used. The three-phase AC power controller comprises at least two semiconductor controllers, preferably three semiconductor controllers, one per phase. The semiconductor switching elements can be, for example, AC power controllers. The AC power controllers can be implemented, for example, as pairs of inverse parallel connected thyristors or as triacs. However, IGBTs or other types of semiconductor switches could also be used. The three-phase AC power controller is connected to a three-phase mains system. The stator winding of the synchronous motor is preferably connected in star without neutral conductor. The AC power controllers are activated or fired, i.e. rendered conducting or prepared for conduction, at particular instants.

With the method according to at least one embodiment of the invention, a rotor position angle is determined. The mechanical position angle advantageously indicates the position of the rotor relative to a definable fixed position. The position angle advantageously ranges from 0 to 360°. Alternatively, the electrical position angle can also be determined, e.g. by evaluating electrical variables on the motor. In addition, the system voltage phase position in at least one of the phases of the stator winding is determined. From the position angle and the system voltage phase position, the firing instants at which the semiconductor controllers are activated or fired are determined.

For subsequent processing, the electrical position angle is advantageously determined or calculated from the mechanical position angle. Conversely, it is also possible to convert other variables such that the mechanical position angle can be used directly.

At least one embodiment of the inventive device for operating a synchronous machine comprises a three-phase AC power controller which can be connected to a three-phase system, and at least two semiconductor controllers for the phases of the three-phase system. A position encoder for determining the position angle of the rotor of the synchronous machine is additionally provided. The device also comprises a device for determining the system voltage phase position for at least one of the phases of the three-phase system. Lastly, a device for defining a pair of two of the semiconductor controllers on the basis of the rotor position angle and a device for defining switching instants for the semiconductor controllers of the pair on the basis of the system voltage phase position are provided.

When the method is carried out, i.e. the device is operated, it is thus possible to define the firing instants for the future at a particular point in time. However, it is also possible for the method to be carried out continuously, i.e. for the device to operate continuously. In other words, the individual steps are repeated at brief intervals. It is then also possible for the firing instants to be defined only for the moment, i.e. it is only decided whether or not to fire now.

The advantage of the method according to at least one embodiment of the invention lies in using the rotor position to define firing instants. This ensures that, even at low speeds of the synchronous motor, only or virtually only positive torque is generated. Positive torque is here taken to mean a torque which, for a run-up process, points in only one of the two possible directions. In other words, only accelerating torque is produced, while decelerating torque is prevented.

In known methods, to run the synchronous motor up to speed, voltage waveforms having a lower frequency than the system frequency are synthesized. Here the frequency to be generated is defined for a particular period of time. At the end of this time, changeover to a higher frequency takes place, thereby defining the frequency.

According to at least one embodiment of the invention, on the other hand, first of all the rotor position is taken into account. Only in the second step is the system voltage phase position considered. The procedure according to the invention therefore results in a voltage waveform which also has characteristics of a voltage waveform of lower frequency than the system frequency. However, the voltage waveforms produced will also have a different appearance as compared to known methods. On the one hand, discontinuities in the voltage waveform are produced by the continued rotation of the rotor. On the other, the frequency of the RMS voltage generated increases directly with the rotor speed and is not increased in stages. The advantage of the invention is that the frequency of the RMS voltage produced does not need to be controlled in any way or even considered at all; rather it is produced automatically and advantageously matched to the current speed of the rotor.

It is advantageous here if an appropriate system voltage phase position for the pair of semiconductor controllers is determined from the position angle. This phase position must be present so that firing instants can be provided. This is due to the fact that a positive torque is only achieved if the voltages have the correct polarity. The actual firing instants are then defined in conjunction with the determined system voltage phase position. Said system voltage phase position is preferably determined in the phases of the pair of two of the at least three semiconductor switching elements.

The device(s) for defining the appropriate system voltage phase position for the pair of two of the semiconductor controllers are preferably designed to perform the defining on the basis of sub-ranges for the entire angular range of the position angle, 0 to 360°, wherein at least some of the sub-ranges are each assigned an appropriate system voltage phase position for the pair of two of the semiconductor controllers, and the device(s) for defining an appropriate system voltage phase position define the system voltage phase position that is assigned to the sub-range containing the position angle.

Likewise the device(s) for defining the pair of two of the semiconductor controllers are preferably designed to perform the defining on the basis of sub-ranges for the entire angular range of the position angle, 0 to 360°, wherein at least some of the sub-ranges are each assigned a pair of two of the semiconductor controllers, and the device(s) for defining a pair define the pair that is assigned to the sub-range containing the position angle.

It is possible to use different sub-ranges for defining the pair and defining the appropriate system voltage phase position. However, the same sub-ranges are advantageously used for defining the pair and defining the appropriate system voltage phase position. It is very advantageous if six sub-ranges of equal size are used as the sub-ranges, each sub-range encompassing 60° of the possible position angle. This makes it possible to produce ideally a continuously positive torque. It is advantageous here to match the position of the sub-ranges in respect of the determined position angle to the actual design of the synchronous motor, so that the currently determined pair and the currently determined appropriate system voltage phase position also match the rotor position in their electrical effect via the stator winding. In other words, the orientation of the sub-ranges or the definition of the position angle 0° must match the orientation of the stator windings.

The sub-ranges used are preferably defined in advance and stored, for example, in a table. Alternatively, the device can be designed to perform the defining of the pair and the defining of the appropriate system voltage phase position programmatically, i.e. by way of a permanently encoded comparison of the determined position angle with the predefined sub-ranges for the position angle.

The device(s) for defining switching instants are expediently designed to cause the semiconductor controllers of the defined pair to switch if the system voltage phase position for both phases of the semiconductor controllers of the defined pair corresponds to the defined appropriate system voltage phase position. Depending on the semiconductor controllers used, the individual semiconductor switching elements can be switched directly or, e.g. in the case of thyristors, fired.

In a preferred embodiment and development of the invention, the device has device(s) for detecting a zero crossing for at least one of the phases. In addition, device(s) for defining a switching angle are preferably provided. If the zero crossing for at least one of the phases is known, and a switching angle is also defined, a firing instant for the corresponding phase can be delayed by the switching angle with respect to the zero crossing. Operation of the synchronous machine during run-up at well below its rated speed causes a lower back-EMF in the stator due to the rotation of the rotor than during rated operation. Much higher currents therefore flow in the stator if the supply voltage is not reduced. During operation from the three-phase AC power controller, a lower voltage RMS value is preferably likewise achieved at the terminals of the machine by changed phase control. For this purpose, the firing angle of the thyristors is set relative to the zero crossing of the system voltage such that the current flowing is as little as possible above the rated current of the synchronous machine. To achieve this at low rotor speeds, for example, a large firing angle can be used, e.g. only 150°, while at sufficiently high rotor speeds a smaller firing angle of e.g. 90° is used (delay time).

The described method is in particular realized in software. With reference to the device described, it has in particular a control unit which is designed to implement the described procedure. It can therefore be simply implemented in existing three-phase AC power controllers without additional complexity in terms of components. Detection of the rotor position is necessary here. It is advantageous if a control unit provided in the synchronous machine and which today is advantageously implemented as a microprocessor assumes control of the three-phase AC power controller. In this case, data from e.g. a position encoder incorporated in the synchronous machine is already automatically available. In addition, such a synchronous machine can already comprise the three-phase AC power controller, i.e. be implemented as a complete unit which can therefore be connected directly to a three-phase system.

BRIEF DESCRIPTION OF THE DRAWINGS

A preferred but in no way limiting exemplary embodiment of the invention will now be explained in greater detail with reference to the accompanying drawings in which the features are schematically illustrated and corresponding features are marked with the same reference characters. In the individual figures:

FIG. 1 shows an equivalent circuit of a three-phase AC power controller with synchronous machine connected and FIG. 2 shows diagrams illustrating the firing instants.

DETAILED DESCRIPTION OF THE EXAMPLE EMBODIMENTS

FIG. 1 shows a three-phase synchronous machine 1 connected to the phases A, B, C of a three-phase system via a three-phase AC power controller 4. Each of the phases A, B, C is assigned a semiconductor controller 6, 7, 8 comprising two thyristors A1, A2, B1, B2, C1, C2 connected in inverse parallel. The firing electrodes of the thyristors A1, A2, B1, B2, C1, C2 are connected to a control device 3 by which the firing signals required for firing the thyristors A1, A2, B1, B2, C1, C2 are provided. The control device 3 also controls the phase control angle. The control device 3 is preferably implemented by a microcontroller. Connected between two phases A, B, C of the system, e.g. between the terminals A and B of the system in FIG. 1, is a voltage measuring device 5 at the output of which the system voltage UAB present between these two terminals A and B is available. Additional voltage measuring devices (not shown) can likewise be provided for the other two phase pairs.

In a first exemplary embodiment, the control device 3 and the three-phase AC power controller 4 are a separate unit from the three-phase synchronous machine 1, i.e. implemented as a separate motor control device. In a second exemplary embodiment, the control device 3 and the three-phase AC power controller 4 are part of the three-phase synchronous machine 1. In this case the functions of the control device 3 are expediently incorporated in a microprocessor already present in the three-phase synchronous machine 1. In the present case, the control device 3 is used to execute a suitable program enabling the device to be software-operated.

An embodiment of the invention is based on the insight that in the case of a cylindrical-rotor synchronous machine 1 the torque m produced by the machine is proportional to the space vector component iSq of the stator current iSR in the rotating coordinate system:

$$m \sim i_{S_q},$$ Equation 1:

where $\overline{i_S^R} = i_{Sd}^R + j \cdot i_{Sq}^R$

Using the electrical position angle θ which corresponds to a measured mechanical position angle multiplied by the number of pole pairs of the motor, and measuring the three stator currents, the stator current space vector can be calculated in rotor coordinates:

$$i_{Sq}^R = i_{LA} \cdot (-\sin \theta_R) + (i_{1B} - i_{1C}) \cdot \cos \theta_R \cdot 3^{-0.5}$$ Equation 2:

From equation 2, firing conditions can be formulated as a function of the rotor position. Provided that the stator winding of the synchronous machine 1 is connected in star without neutral conductor and assuming current flow in precisely two phases A, B, C in each case, three different relations of the above equation can be stated:

$$i_{Sq}^R|_{i_{LA}=-i_{1B}} = i_{LA} \cdot (-\sin \theta_R - \cos \theta_R \cdot 3^{-0.5})$$ Equation 3a:

$$i_{Sq}^R|_{i_{LA}=-i_{1C}} = i_{LA} \cdot (-\sin \theta_R + \cos \theta_R \cdot 3 - 0.5)$$ Equation 3b:

$$i_{Sq}^R|_{i_{1B}=-i_{1C}} = i_{1B} \cdot (\cos \theta_R \cdot 2 \cdot 3^{-0.5})$$ Equation 3c:

FIG. 2 shows the linked trigonometric functions according to the bracket terms in equation 3 for two periods of the electrical angle θ, i.e. an angular position of the rotor of 0°/p to 720°/p (p=number of pole pairs). Here the electrical angular position of the motor is represented on the abscissa, not the variation over time. Therefore, all the waveforms from 2 π to 4 π are an exact copy of the waveforms from 0 to 2 π. FIG. 2 additionally shows the possible resulting conducting ranges of the thyristors A1, A2, B1, B2, C1, C2 for the phase pairings AB, AC and BC. Certain ranges 21 are mutually exclusive, as they require the conduction of both thyristors A1, A2, B1, B2, C1, C2 of a semiconductor controller 6, 7, 8 simultaneously in each case. If these states are excluded, a firing sequence according to FIG. 2 below can be specified in which two semiconductor controllers 6, 7, 8 are fired in each case. To this extent, defining the firing instants is by and large oriented exclusively to the rotor position and does not take account of the phase position of the system voltage.

Thus, with the elimination of conflicting conduction requirements in the position angle θ range between 5/6 π and 7/6 π, the phase pair BC is produced. The resulting pair of semiconductor controllers to be fired are the corresponding semiconductor controllers 7, 8 for the phases B and C. The appropriate system voltage phase position between the phases B and C is negative here, corresponding to a current flow from phase C to phase B. In the subsequent sub-range of the position angle θ between 7/6 π and 9/6 π, the pair of semiconductor controllers 6, 7 to be defined is that of the phases A and B. The appropriate system voltage phase position between the phases A and B is positive here, corresponding to a current flow from phase A to phase B. The further sub-ranges operate similarly in accordance with FIG. 2.

In addition to the orientation of the firing sequence to the rotor position, synchronization of the firing with the system voltage advantageously takes place. This ensures that conduction of the thyristors A1, A2, B1, B2, C1, C2 is only possible if the system voltage phase position of the respective system voltage is correct for the respective phase A, B, C, i.e. if the desired torque is also actually produced. The transition to the firing-ready state can also be effected in a delayed manner, i.e. using a firing angle. For example, firing could take place with a delay of 90° relative to the system frequency, starting from the positive zero crossing of the voltage UAB.

If, by way of example, the rotor of the synchronous machine 1 is in a position of rest at a position angle of approximately 1/3 π prior to run-up, the control system causes firing instants to be enabled only for the semiconductor controllers 6, 7 of the phases A and B. In addition, the control system checks continuously whether the polarity of the voltages applied from the three-phase system coincide with the appropriate system voltage phase position, in this case negative when viewed from phase A to phase B. Only if this is the case do the potential firing instants for the semiconductor controllers 6, 7 of the phases A and B become actual firing instants at which current conduction is therefore also enabled.

The result of this in the example given is that an essentially pulsed DC voltage is forwarded by the three-phase AC power controller 4 to the stator windings of the synchronous machine 1, said pulsing being produced by the frequency of the three-phase system. This is maintained until the rotor, due to its starting rotation, exceeds the limit of the position angle of 3/6 π, causing its position angle to enter the next sub-range 21 between 3/6 π and 5/6 π. In this sub-range 21, switchover to the semiconductor controllers 6, 8 of the phases A and C now takes place as shown in FIG. 2. The continued rotation of the rotor subsequently causes another switchover between the sub-ranges 21 and therefore between the semiconductor controllers 6, 7, 8 used. As soon as the rotor is no longer at rest, this results in AC voltages being forwarded by the semiconductor controllers 6, 7, 8. As the polarity of the forwarded voltages conforms to the rotor position, the frequency of these AC voltages conforms to the rotation speed of the rotor.

The fact that a selection of two semiconductor controllers 6, 7, 8 from three available semiconductor controllers 6, 7, 8 is made means that at each transition of the position angle θ of the rotor from one sub-range 21 to the next sub-range 21, one of the semiconductor controllers 6, 7, 8 used is changed, while the other semiconductor controller 6, 7, 8 used remains the same. FIG. 2 shows that at the transition from one sub-range 21 to the next sub-range 21, the thyristor A1, A2, B1, B2, C1, C2 responsible for the actual current conduction for the unchanging semiconductor controller 6, 7, 8 remains the same. A change in the system voltage phase position for one of the semiconductor controllers 6, 7, 8 is only produced after a change from a sub-range 21 in which that semiconductor controller 6, 7, 8 was inactive.

In the case of implementation at 50 Hz system frequency, the period of the voltage is 20 ms. For an AC power controller, potential firing instants are therefore produced every 20 ms. As a result, the negative half waves of the voltage are automatically removed. Particularly when the rotor is already rotating at considerable speed, it must be taken into account that the transition from one of the sub-ranges of the position angle to another sub-range takes place at a similar rate to the zero crossings of the system voltage. The pair of AC power controllers may then change while the previously valid pair is still triggered. If the rotor speed is not too slow, potential firing instants therefore arise every 20 ms/3, i.e. approximately every 6 ms.

This additionally has the effect that in some circumstances current still flows through one of the semiconductor switches of an AC power controller, although ideally the latter should no longer be active at all, because the rotor has moved into the next sub-range in which the other two AC power controllers should be active. When using thyristors this cannot be prevented directly. Under the circumstances mentioned, an undesirable negative torque is therefore produced until the current has decayed in the "wrong" AC power controller.

It is therefore very advantageous here to influence the firing angle. If on the basis of the rotor position a progression to the next sub-range of the position angle is expected while current is still flowing in the then incorrect AC power controller, the total current flowing can be reduced by way of a changed firing angle. For this purpose, the thyristors are, for example, fired later. A reduced current ensures a shorter time interval until the current decays again and the thyristors turn off.

The invention claimed is:

1. A device for operating a synchronous machine, comprising:
    a three-phase AC power controller connectable to a three-phase system and including at least two semiconductor controllers for the phases of the three-phase system;
    a position encoder configured to determine a position angle of the rotor of the synchronous machine;
    a first device configured to determine the system voltage phase position for at least one of the phases of the three-phase system;
    at least one second device, configured to specify a pair of two of the semiconductor controllers on the basis of the position angle of the rotor;
    at least one third device, configured to specify switching instants for the semiconductor controllers of the respective pair on the basis of the system voltage phase position; and
    at least one fourth device, configured to specify an appropriate system voltage phase position for the pair of two of the semiconductor controllers for producing a positive torque on the basis of the position angle of the rotor, wherein
        the at least one fourth device, configured to specify an appropriate system voltage phase position for the pair of two of the semiconductor controllers is designed to perform the specification on the basis of sub-ranges for the total angular range of the position angle, 0 to 360°, wherein at least some of the sub-ranges are each assigned an appropriate system voltage phase position for the pair of two of the semiconductor controllers, and the at least one fourth device, configured to specify an appropriate system voltage phase position specifies the system voltage phase position assigned to the sub-range containing the position angle.

2. The device as claimed in claim 1, comprising a stored table in which the sub-ranges and the assigned appropriate system voltage phase positions are stored.

3. The device as claimed in claim 1, wherein the at least one second device, configured to specify a pair of two of the semiconductor controllers is designed to perform the specification on the basis of sub-ranges for the total angular range of the position angle, 0 to 360°, wherein at least some of the sub-ranges are each assigned a pair of two of the semiconductor controllers, and the at least one second device, configured to specify a pair, specify the pair assigned to the sub-range containing the position angle.

4. The device as claimed in claim 3, comprising a stored table in which the sub-ranges and the assigned pairs are stored.

5. The device as claimed in claim 1, implemented such that six sub-ranges are used.

6. The device as claimed in claim 1, implemented such that each sub-range encompasses an angular range of the electrical position angle of 60°.

7. The device as claimed in claim 1, wherein the at least one third device, configured to specify switching instants are designed to cause the semiconductor controllers of the specified pair to switch if the system voltage phase position for both phases of the semiconductor controllers of the specified pair corresponds to the appropriate system voltage phase position.

8. The device as claimed in claim 1, further comprising:
    at least one fifth device, configured to determine a zero crossing for at least one of the phases; and
    at least one sixth device, configured to switch an angle by which switching instants are specified with a delay with respect to the voltage zero crossing.

9. The device as claimed in claim 1, comprising three semiconductor controllers, each including two inverse parallel connected thyristors.

10. A method for operating a synchronous machine including a three-phase AC power controller connected to a three-phase system and including at least two semiconductor controllers, rendered conducting or fired at particular firing instants, the method comprising:
    determining a rotor position angle of the synchronous machine;
    determining a system voltage phase position in at least one of the phases of the three-phase system;
    specifying the firing instants on the basis of the position angle and the system voltage phase position such that a positive torque is produced; and
    specifying an appropriate system voltage phase position for the at least two semiconductor controllers for producing a positive torque on the basis of the position angle of the rotor, wherein
    specifying the appropriate system voltage phase position for the at least two semiconductor controllers is performed on the basis of sub-ranges for a total angular range of the position angle, 0 to 360°, wherein at least some of the sub-ranges are each assigned an appropriate system voltage phase position for the at least two semiconductor controllers, and the specify the appropriate system voltage phase position specifies a system voltage phase position assigned to the sub-range containing the position angle.

* * * * *